(12) United States Patent
Liu

(10) Patent No.: US 8,181,174 B2
(45) Date of Patent: May 15, 2012

(54) VIRTUAL MACHINE CONFIGURATION SYSTEM

(75) Inventor: Huan Liu, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 1123 days.

(21) Appl. No.: 11/966,719

(22) Filed: Dec. 28, 2007

(65) Prior Publication Data

US 2009/0172662 A1 Jul. 2, 2009

(51) Int. Cl.
G06F 9/455 (2006.01)
G06F 9/445 (2006.01)
(52) U.S. Cl. .......................................... 718/1; 717/121
(58) Field of Classification Search .................. 718/1
See application file for complete search history.

(56) References Cited

U.S. PATENT DOCUMENTS

| | | | |
|---|---|---|---|
| 5,606,681 A * | 2/1997 | Smith et al. ................. 711/203 |
| 6,802,062 B1 * | 10/2004 | Oyamada et al. ................ 718/1 |
| 6,912,617 B2 * | 6/2005 | Dmitriev ............................ 711/6 |
| 7,356,679 B1 * | 4/2008 | Le et al. ............................. 713/1 |
| 7,577,722 B1 * | 8/2009 | Khandekar et al. ........... 709/220 |
| 7,680,957 B1 * | 3/2010 | Ketterhagen et al. ......... 709/246 |
| 7,779,389 B2 * | 8/2010 | Markov et al. ................ 717/121 |
| 2003/0225917 A1 * | 12/2003 | Partamian et al. ............. 709/310 |
| 2004/0015647 A1 | 1/2004 | Dmitriev ............................ 711/6 |
| 2005/0289538 A1 * | 12/2005 | Black-Ziegelbein et al. . 717/177 |
| 2006/0184936 A1 * | 8/2006 | Abels et al. ........................ 718/1 |
| 2007/0006225 A1 | 1/2007 | McAlister et al. ................ 718/1 |
| 2007/0101323 A1 | 5/2007 | Foley et al. ........................ 718/1 |
| 2007/0168478 A1 | 7/2007 | Crosbie .......................... 709/221 |
| 2007/0168965 A1 * | 7/2007 | Zenz et al. ...................... 717/121 |
| 2007/0234356 A1 | 10/2007 | Martins et al. .................... 718/1 |
| 2007/0260831 A1 | 11/2007 | Michael et al. ................ 711/162 |
| 2008/0098309 A1 * | 4/2008 | Fries et al. ...................... 715/734 |
| 2008/0163210 A1 * | 7/2008 | Bowman et al. ................. 718/1 |
| 2008/0201709 A1 * | 8/2008 | Hodges ............................. 718/1 |
| 2008/0307414 A1 * | 12/2008 | Alpern et al. ..................... 718/1 |

FOREIGN PATENT DOCUMENTS

EP   1 376 351 A2   1/2004

OTHER PUBLICATIONS

Open Virtual Machine Format Specification (OVR) Submitted to DTMF, Version 0.9, VMware, Inc. XenSource, Inc. 50 pgs., Sep. 11, 2007.
Open Virtual Machine Format Specification, Version 0.9, VMware, Inc., XenSource, Inc., Palo Alto, Sep. 7, 2007.

(Continued)

*Primary Examiner* — Meng An
*Assistant Examiner* — Kevin X Lu

(57) ABSTRACT

A computing device configures virtual machines using configuration commands. Each of the virtual machines may boot from a corresponding virtual machine image file. As a virtual machine boots or executes, the virtual machine may read from or write to application and operating system files included in the corresponding virtual machine image file. Prior to the virtual machine booting, the computing device may get or set configuration properties of the operating system and applications to be booted in a respective virtual machine by reading from or writing to the application and operating system files included in the corresponding virtual machine image file. The computing device may execute configuration commands to get or set the configuration properties of the operating system and the applications.

22 Claims, 6 Drawing Sheets

OTHER PUBLICATIONS

Vitaletti, Marcello, Draper, Christine, George, Randy, McCarthy, Julia, Poolman, Devin, Miller, Tim, Middlekauff, Art, Montero-Luque, Carlos, Installable Unit Deployment Descriptor Specification Version 1.0, InstallShield Software Corporation, International Business Machines, Inc., Novell, Inc., Zero G Software, Inc., 2004.

Performance Customization of VMs?, VMware Communities, Nov. 20, 2006.

Ganguly, A., Yin, J., Shaikh, H., Chess, D., Eilem, T., Figueiredo, R., Hansom, J., Mohindra, A., Pacifici, G., Reducing Complexity of Software Deployment with Delta Configuration, 10$^{th}$ IFIP/IEEE International Symposium on Integrated Network Management 2007, IM '07 [Online] (May 21, 2007-May 25, 2007), pp. 729-732, XP002524618.

European Search Report for Application No. 08254114.5-1243, dated May 13, 2009.

* cited by examiner

VIRTUAL MACHINE CONFIGURATION SYSTEM

FIELD OF THE INVENTION

The field of invention relates generally to software configuration. In particular, the invention relates to configuration of virtual machines.

BACKGROUND

Configuring an application correctly can be a time consuming and labor intensive manual process. Correctly configuring the application may require a human to make configuration settings using a graphical user interface (GUI), where a slight mistake could cause the application to malfunction. Some applications are very complex to configure because the applications may involve several tiers. A tier may be defined as a group of one or more servers that perform a similar function. For example, two-tier applications may involve configuring a web server and a database server. A three-tier application might involve configuring a web server, an application server, and a database server. Each tier may include multiple machines in order to handle load balancing and machine failover.

Each server may require at least some manual configuration and dramatically increase the complexity and likelihood for introducing configuration errors. A typical enterprise application, such as a Customer Relationship Management (CRM) application or an Enterprise Resource Planning (ERP) application can take days or weeks to install and configure.

One of the difficulties of configuration involves the tier-to-machine mapping. During development, all tiers may be mapped to the same physical machine to save on hardware costs. In this typical configuration, all of the applications used in each tier may be installed on the same physical machine. In contrast, in a production configuration, each tier may be mapped to one or more physical machines to maximize scalability and reliability. In this typical production configuration, the applications in each tier may be installed only on each machine that belongs to that tier. Thus each machine has a different configuration.

Virtualization technology has alleviated some of the configuration problems associated with some types of these complex applications. Virtual machines use a hardware emulation layer so that multiple operating systems may execute simultaneously on the same physical hardware, because the hardware emulation layer makes the physical hardware appear as dedicated hardware to each of the operating systems.

A virtual machine may be booted from an image file. An image file may be an image of software installed in a computer system that may include an operating system and various applications. Sometimes, an image file of software installed in a computer system for a particular purpose is known as a virtual appliance. For example, the software in a particular tier for a given application may be installed in a computer system. An image file created from that computer system may be called a virtual appliance. The image file may subsequently be used to boot virtual machines belonging to that tier.

In the typical developer configuration, a virtual machine for each tier could boot on the same physical machine, each virtual machine booting from a different image file. Alternatively, in a production environment, multiple virtual machines for a given tier may boot from the same image file. Each virtual machine may run on a separate physical machine.

Although an image file may include a set of preinstalled software, further configuration of that software or the installation of additional components is often left for the user to complete manually. One reason for this is that some information used to configure a machine is not known at the time the image file was created. For example, network settings may only be known after booting a virtual machine from an image file in the target configuration. Generally, if an application requires using multiple virtual machines, the booted virtual machines must be, at least to some extent, manually configured.

SUMMARY

A computing device configures virtual machines using configuration commands. Each of the virtual machines may boot from a corresponding virtual machine image file. As a virtual machine boots or executes, the virtual machine may read from or write to application and operating system files included in the corresponding virtual machine image file. Prior to the virtual machine booting, the computing device may get or set configuration properties of the operating system and applications to be booted in a respective virtual machine by reading from or writing to the application and operating system files included in the corresponding virtual machine image file. The computing device may execute configuration commands to get or set the configuration properties of the operating system and the applications.

Logic associated with reading from and writing to the application and operating system files may be encapsulated in a virtual machine module. The virtual machine module may have an application programmer interface (API) that includes one or more methods that get or set named properties of a virtual machine. The named properties may be referred to as configuration properties of the virtual machine. The configuration properties of the virtual machine may correspond to the configuration properties of the operating system and the applications of the virtual machine.

The computing device may execute configuration commands that are executable to access configuration properties of the virtual machines. The computing device may execute the API of the virtual machine module to execute the configuration commands. The configuration properties of the virtual machines obtained by a configuration command may be made available to one or more subsequently executed configuration commands.

The configuration commands may make a reference to a copy of a virtual machine image file instead of the virtual machine image file itself. In this manner, the same virtual machine image file may be used to boot different virtual machines, where each of the different virtual machines has a different configuration.

The configuration commands may be represented in XML. A configuration command to get or set a property of a virtual machine may be represented as a single XML element. A configuration command to map a virtual machine image file to a virtual machine identifier may also be represented as a single XML element. A configuration command to boot a virtual machine given a virtual machine identifier may also be represented as a single XML element. One configuration command may pass a value to another configuration command by being represented as a child XML element of a parent XML element, where the other configuration command is represented as the parent XML element.

An interesting aspect of the computing device is that the configuration commands may configure multiple virtual machines using configuration properties obtained from one virtual machine to set configuration properties of another virtual machine. For example, one configuration command may get a configuration property of the operating system of one virtual machine and use that configuration property to set a configuration property of an application in a different virtual machine.

Another interesting aspect of the computing device is that the configuration commands may also configure virtual machines that are already booted. For example, a configuration command may set a property of a booted virtual machine by communicating with an agent module executing within the booted virtual machine.

Further objects and advantages of the present invention will be apparent from the following description, reference being made to the accompanying drawings wherein preferred embodiments of the present invention are clearly shown.

BRIEF DESCRIPTION OF THE DRAWINGS

The system may be better understood with reference to the following drawings and description. The components in the figures are not necessarily to scale, emphasis instead being placed upon illustrating the principles of the invention.

DETAILED DESCRIPTION

Figure 1:
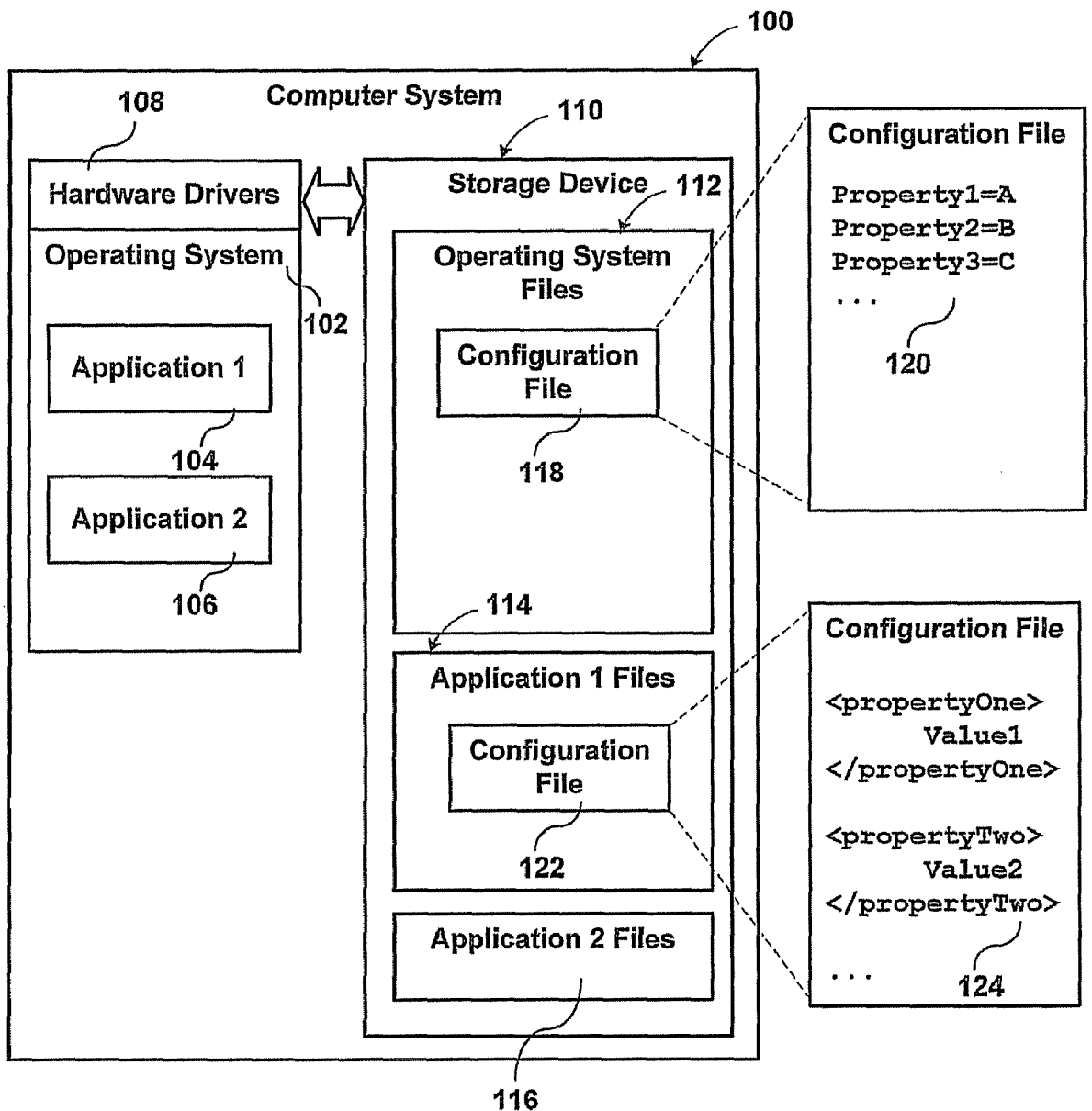
FIG. 1 is an illustration of an example computer system with pre-installed software.

FIG. 1 is an illustration of an example computer system with pre-installed software. The example computer system 100 has an operating system 102 and two applications, 104 and 106, installed. The operating system 102 may have hardware drivers 108 that the operating system 102 uses to communicate with hardware devices. One such hardware device may be a storage device 110. The storage device 110 can be any kind of memory, memory storage device or a combination of different kinds of memory or memory storage devices, including, but not limited to: random access memory (RAM), read only memory (ROM), hard disk, optical disk, digital video disk (DVD), compact disk read only memory (CD-ROM), etc.

The storage device 110 may contain operating system files 112 and one or more application files, 114 and 116. Some of the operating system files 112 may be executable binaries. When the computer system 100 boots or begins to execute instructions, the executable binaries may be loaded into memory from the operating system files 112 that are stored on the storage device 110 and executed, thus beginning the operation of the computer system 100. A computer system may be said to boot (or be in the process of booting) when the computer system performs the operations required to place the computer system into a normal operating configuration after power is supplied to the hardware. A computer system may be considered in a normal operating configuration when the operating system has started, which is when applications may execute within the operating system. Once applications may execute within the operating system, the operating system and the computer system are said to have been booted. In some examples, the operating system may still be in the process of starting when applications may execute within the operating system—in such examples, the operating system and the computer system are said to have been booted even though the operating system may still be starting. An application is any software that requires an operating system in order to execute, such as a web server, database server, word processor, network driver, network service, browser plug-in, etc. A software program may be an operating system or an application. A storage device 110 that contains operating system files 112 is said to be bootable if a computer system may boot from that storage device 110.

The operating system 102 may read one or more configuration files as it boots in order to read configuration settings stored in the configuration files. For example, an operating system (OS) configuration file 118 is shown in FIG. 1. The OS configuration file 118 may be of any format for storing configuration settings, such as: binary, extensible markup language (XML), INI format (i.e., name value pairs separated by the "=" symbol), etc. In the example shown, the OS configuration file 118 contains at least three properties 120 with the names Property1, Property2, and Property3, having the values A, B, and C, respectively. In other examples, the OS configuration file 188, may contain more or fewer properties, properties with different names or values, and be in a different format.

As the operating system 102 boots, the operating system 102 may need to determine the value of a particular property, such as the property "Property1." The operating system 102 may also need to determine the value of the particular property after the operating system 102 boots. To determine the value of the particular property, the operating system 102 may read the OS configuration file 118, and then parse the contents of the OS configuration file 118 to determine the value of the particular property. Depending on the operating system 102 and the particular property to be read, it may be possible to modify the value of the property in the OS configuration file 118 before the operating system 102 boots in order to configure that particular property. In some cases, it may be necessary to change multiple OS configuration files in order to change one property of the operating system 102.

Similarly, when an application, 104 or 106, is launched within the operating system 102, the application's executable binaries included in the application files, 114 or 116, may be loaded into memory from the storage device 110 and then executed. Also, when the application, 104 or 106, executes, the application may read configuration settings from an application configuration file 122.

Depending on the application, 104 and 106, and the particular property 124 to be read, it may be possible to modify the value of the property in application configuration file 122 before the application 104 launches in order to configure that particular property 124 of the application. In some cases, it may be necessary to change multiple application configuration files 122 in order to change one property of the application 104.

As discussed above, a computer system 100 may include (1) hardware on which an operating system 102 executes, (2) the operating system 102, and (3) applications, 104 and 106, that execute within the operating system 102. In contrast, the term "virtual machine" as used herein, is defined as software that includes (1) emulation software that emulates the hardware of the computer system 100 and (2) an operating system 102 configured to execute on the emulation software. The phrase "configured to execute on the emulation software" includes an operating system 102 configured to execute on the hardware of the computer system 100, but that actually executes on emulation software. The emulation software may include hardware emulation drivers that emulate the hardware drivers 108 that the operating system 102 uses to communicate with hardware devices. The term "virtual machine" as used herein, may refer to software that includes one or more applications, 104 and 106, that execute within the operating system 102. The term "virtual machine" as used herein, may refer to an operating system 102 configured to execute on the emulation software and one or more applications, 104 and 106, that execute within the operating system 102 without referring to the emulation software itself.

A virtual image file of the computer system 100 may contain all of the operating system files 112 and application files, 114 and 116. The virtual image file may be in a format specific to virtualization software to be used. Available vendor virtualization software includes, but is not limited to: Xen, VMware, and Microsoft's "Viridian" project. The virtual image file may also include information in addition to the operating system files 112 and application files, 114 and 116, such as information used only by the vendor virtualization software. By including at least the operating system files 112 and application files, 114 and 116, the vendor virtualization software is able to boot, as a virtual machine, a system originally installed and configured in the computer system 100. A virtual machine is said to boot when an operating system installed in the virtual machine starts (in response to the hardware emulation software emulating power being supplied to the hardware) and the one or more applications may execute within the operating system. The component of the vendor virtualization software with the capability to boot a virtual machine from a virtual image file will be referred to as a virtual machine management system (VMMS). The virtual machine management system may have additional functionality, such as functionality to query.

Logically, each virtual machine may be viewed as having a set of properties that may be accessed, i.e., read or modified. This set of virtual machine properties is a set or subset of the properties of the operating system and the properties of applications that are stored in the application configuration files, 118 and 122. This set of virtual machine properties may also include logical properties as well. Logical properties are properties that represent a state of a virtual machine, where the state is not necessarily stored in an application configuration file. For example, a logical property could indicate a vendor of a type of application that is installed in the virtual machine. There may be two kinds of virtual machine properties: static or dynamic. Static properties may be changed before booting the virtual machine. Dynamic properties may be changed before and after booting the virtual machine. The virtual machine properties may have different data types.

Figure 2:
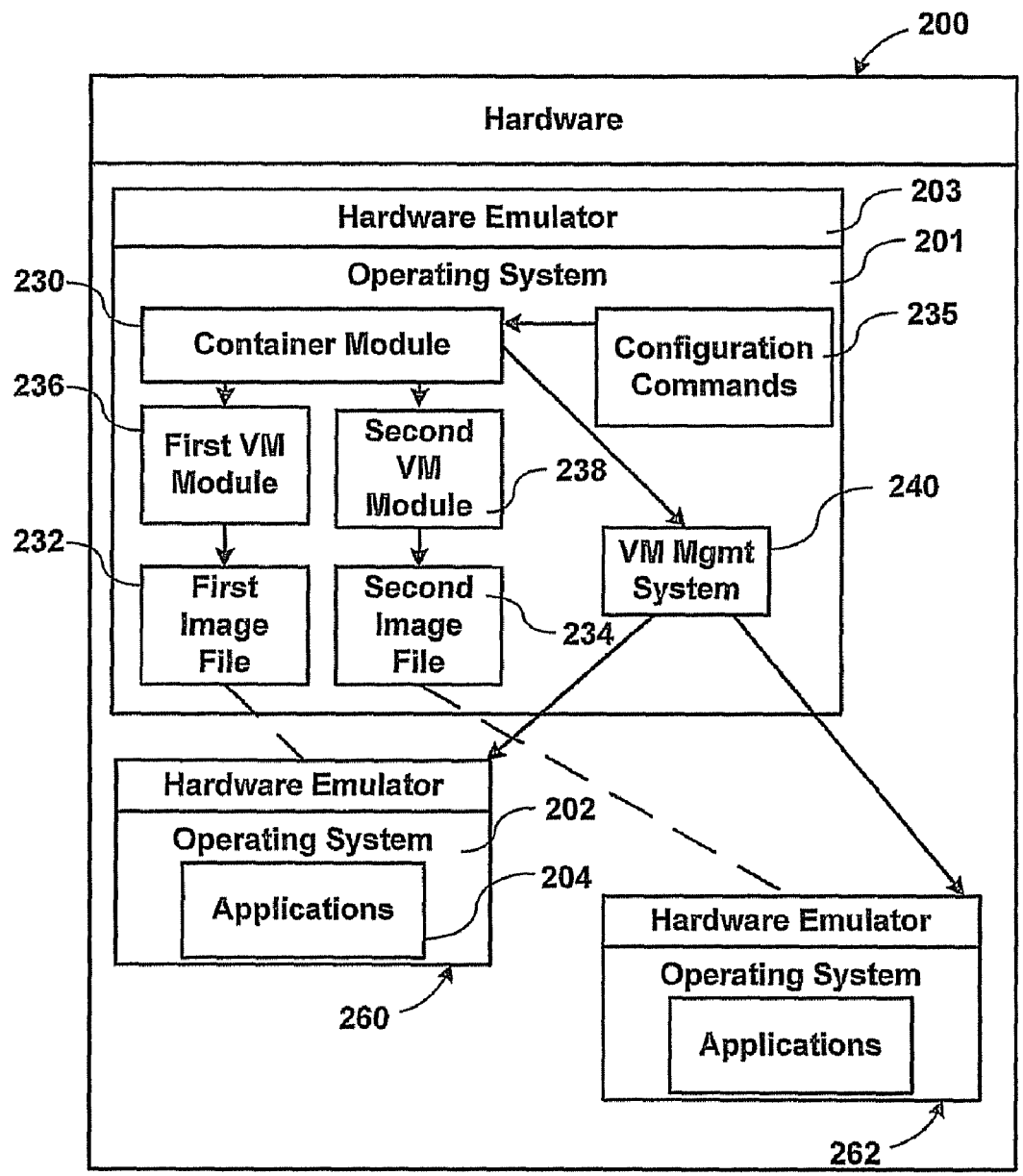
FIG. 2 is an illustration of a first example computing device for configuring virtual machines.

FIG. 2 is an illustration of a first example computing device for configuring virtual machines. The computing device 200 may include an operating system 201. The operating system 201 may run in a virtual machine that includes a hardware emulator 203 or in a non-virtualized computer system that does not include a hardware emulator 203. The hardware emulator 203 is the emulation software discussed above. A container module 230 may execute within the operating system 201. The container module 230 may obtain the configuration commands 235, load virtual machine modules, 236 and 238, and direct the virtual machine modules, 236 and 238 to execute in order to configure image files, 232 and 234 based on one or more configuration commands 235. The one or more configuration commands 235 may be represented in XML, for example. The configuration commands 235 may include commands to get and set configuration properties of a virtual machine operating system 202 and/or virtual machine applications 204. The configuration commands 235 may specify which virtual machine, 260 or 262, the configuration commands are directed to.

Each virtual machine, 260 or 262, may correspond to image files, 232 and 234. Alternatively, each virtual machine, 260 or 262, may correspond to a copy of a specified image file, 232 or 234. By operating on a copy of the image file, two or more virtual machines based on the same image file may be configured differently.

To execute a configuration command(s) that gets or sets configuration properties of a virtual machine, 260 or 262, the container module 230 may execute a virtual machine module, 236 or 238, that corresponds to the image file, 232 or 234. In order to set a configuration property to a value specified in the configuration command, code in the virtual machine module, 236 or 238, may modify an appropriate configuration file in the image file, 232 or 234. In order to get a configuration property specified in the configuration command, code in the virtual machine module, 236 or 238, may parse the appropriate configuration file in the image file, 232 or 234.

The configuration command(s) may also include one or more configuration command for booting a virtual machine, 260 or 262. To execute such a boot configuration command, the container module 230 may invoke code in a virtual machine management system 240 (VMMS), and the container module 230 may pass the VMMS 240 a reference to the image file, 232 or 234, that corresponds to the virtual machine, 260 or 262. The reference to the image file, 232 and 234, may be a path name, a network address, a short cut, a predefined alias, or any other identifier of the image file, 232 or 234. The VMMS 240 may be executable to boot the virtual machine, 260 or 262, on the same computing device 200 that the operating system 201 currently executes on, or on a machine external to the computer device 200. When the virtual machine, 260 or 262, boots, the virtual machine operating system 202 and/or the virtual machine applications 204 will be configured based on modifications made to the image file, 232 or 234.

Figure 3:
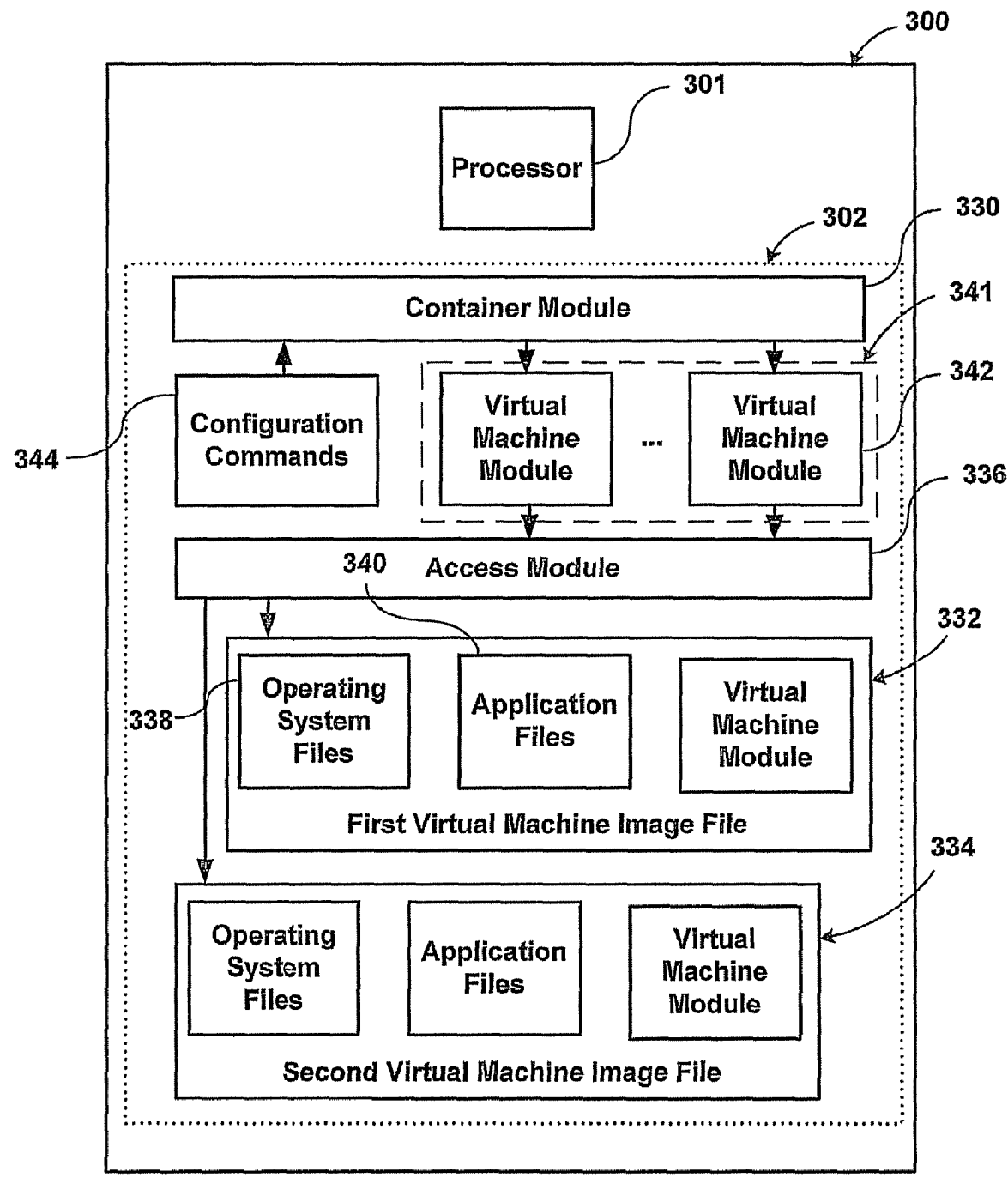
FIG. 3 is an illustration of a second example of a computing device for configuring virtual machines.

FIG. 3 is an illustration of a second example of a computing device for configuring virtual machines. In this example, the computing device 300 includes a processor 301 and a computer readable memory 302. The processor 301 may be any device or system capable of performing logic operations, analog or digital. The memory 302 may be any known or later discovered computer readable medium for storing data or code, such as random access memory (RAM), read only memory (ROM), hard disk, optical disk, digital video disk (DVD), compact disk read only memory (CD-ROM), etc. The computer readable memory 302 may include computer code and virtual machine image files, 332 and 334. The computer code may be written in any computer language, such as C, C<, Java, C#, assembly language, Perl, etc. The computer code may or may not run within an operating system. The computing device 300 may include one, two, or more than two virtual machine image files, 332 and 334.

The computer code may include an access module 336 executable with the processor 301 to access one or more application files 340 and operating system files 338 included in each of the virtual machine image files, 332 and 334. The access module 336 may be part of a VMMS. For example, the access module 336 may include an operating system extension provided by the VMMS that mounts a virtual machine image file, 332 or 334, into an operating system as a drive or a directory accessible by code executing within the operating system. In another example, the access module 336 may be code capable of processing standard file compression formats, such as ZIP, TAR, GZ, etc., if the format of the virtual machine image files, 332 and 334, is in such a format. Each of the virtual machine image files, 332 and 334, may be bootable in a virtual machine. The specifics of the vendor virtualization software may determine whether a VMMS is used to boot the virtual machine from the virtual machine image file.

In the example computing device 300 shown in FIG. 3, the computer code may include one or more virtual machine modules 341. Each of the virtual machine modules 342 may be executable with the processor 301 to access configuration properties of applications and/or an operating system configured in at least one of the virtual machine image files 332. Details of how the virtual machine modules 341 operate follow below.

In the example computing device 300 shown in FIG. 3, the computer code may include a container module 330. The container module 330 may obtain configuration commands 344 from a file stored in the computer readable memory 302. The format of the file may be an XML text file. Alternatively, the file may be of any format now known or later discovered for representing commands, such as JavaScript, VBScript, Perl, various build file syntaxes, etc. The configuration commands 344 are configured, for example, to access configuration properties of the applications and the operating system configured in a virtual machine image file, 332 or 334.

The container module 330 may execute the configuration commands 344. The container module 330 may invoke at least one of the virtual machine modules 341 to access the configuration properties stored in files, 338 and 340, included in the virtual machine image file, 332 or 334.

Figure 4:
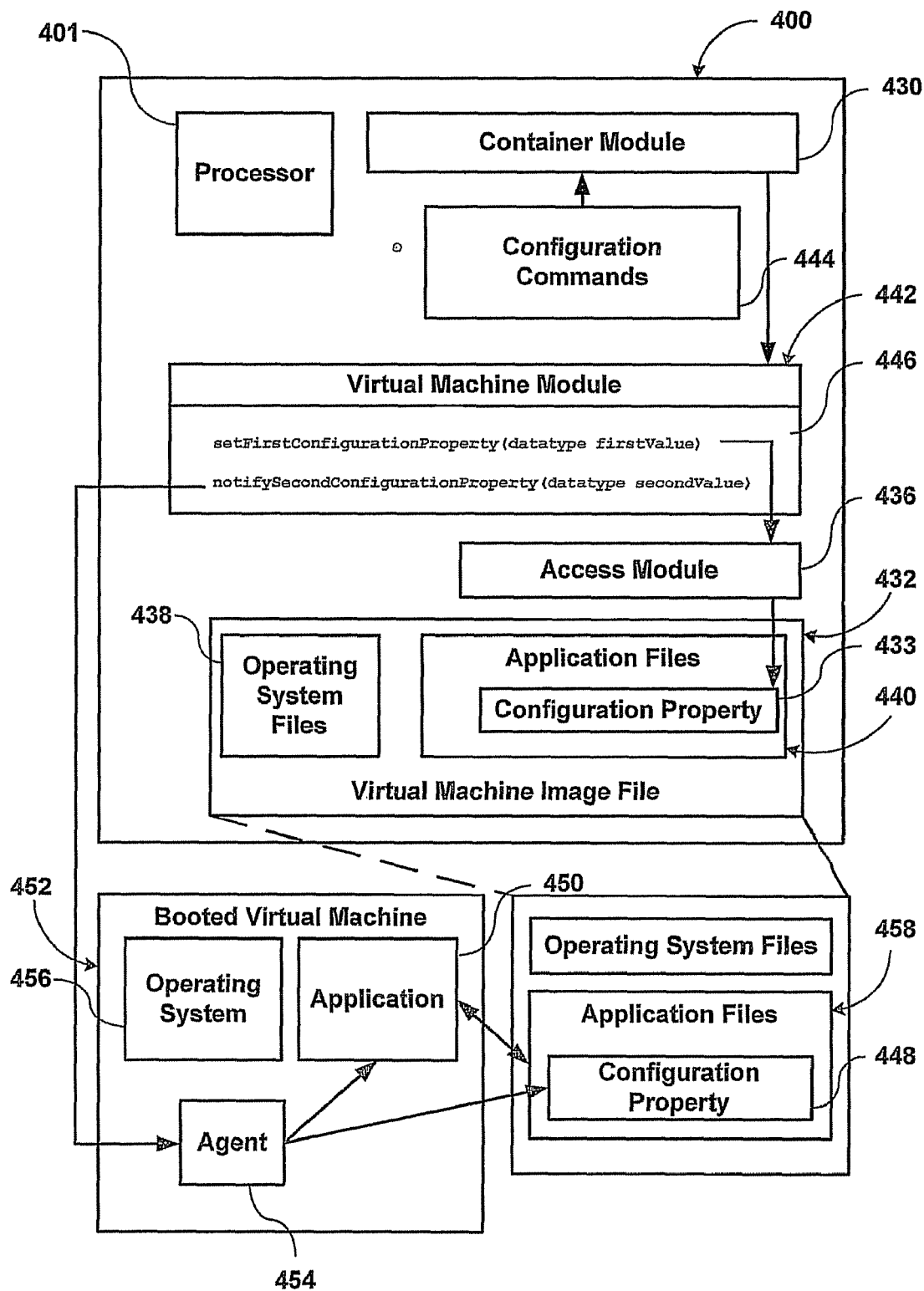
FIG. 4 is an illustration of a third example of a computing device for configuring virtual machines.

FIG. 4 is an illustration of a third example of a computing device 400 for configuring virtual machines. The computing device 400 in FIG. 4 illustrates how a virtual machine module 442 may operate. The computing device 400 comprises a processor 401 and a container module 430 executable with the processor 401. The computing device 400 also may include the virtual machine module 442 and an access module 436, both executable with the processor 401. The computing device 400 also may include a virtual machine image file 432. The virtual machine image file 432 may include virtual machine (VM) operating system files 438 and one or more VM application files 440. A configuration property 433 may be stored in one of the application files 440. In other examples, the computing device 400 may include more than one virtual machine image file 432.

The container module 430 may obtain configuration commands 444, including one or more configuration commands 444 to access the configuration property 433 stored in one of the application files 440. The container module 430 may also load the virtual machine module 442 and direct the virtual machine module 442 to execute in order to access the configuration property 433 instead of directly invoking the access module 436 or directly accessing the application files 440. The container module 430 may be configured to execute a virtual machine module 442 written in one of a predetermined set of programming languages. The predetermined set could be any set of programming languages, such as Java and C++. Alternatively, the container module 430 may be configured to execute a virtual machine module 442 written in one predetermined programming language. A programming language may be an interpretive language, such as Java, BASIC, C#, etc. Software code written in an interpretive language may be interpreted by a language-specific code module as the software code executes. A programming language may also be a compiled language, such as C, C++, assembly language, etc. Software code written in a compiled language may first be compiled with a code module known as a compiler to generate a binary executable. The binary executable may contain code instructions understood by the processor 401. The phrase "executable with the processor" used herein applies generally to software code written in either an interpretive language or a compiled language.

The term "sub-module" as used herein, is defined as equivalent to a method, function, or subroutine. A sub-module may or may not have any parameters and may or may not have a return value.

The virtual machine module 442 may expose an application program interface (API) 446 containing methods for getting and/or setting properties by name. The logic of locating a particular application or operating system file where the configuration property 433 is stored may then be encapsulated in the implementation code of that API. Code for accessing and parsing the particular application or operating system file may also be encapsulated in the implementation of the virtual machine module 442. Alternatively, in a different example, code for accessing and parsing the particular application or operating system file may be encapsulated in the container module 430. In the latter example, code in the virtual machine module 442 may be neutral to the vendor virtualization software used.

In one example, the API 446 may include a setter method (e.g., "setFirstConfigurationProperty") with a value argument (e.g., "firstValue"). The setter method may have a prefix (e.g., "set") concatenated with a name of one of the configuration properties 433 (e.g., "FirstConfigurationProperty"). The setter method is executable to set the configuration property 433 to the value argument. In other examples, a different naming convention may be used. In still other examples, no naming convention may be followed.

The API 446 may include a getter method (e.g., "getFirstConfigurationProperty") with a value return value. The getter method may have a prefix (e.g., "get") concatenated with a name of one of the configuration properties 433 (e.g., "FirstConfigurationProperty"). The getter method may be executable to return the value of the configuration property 433. In other examples, a different naming convention may be used. In still other examples, no naming convention many be followed.

The implementation of methods in the API 446 that access a configuration property 433 may execute the access module 436 to access the configuration property 433 stored in one of the application files 440. In some examples, the implementation of the methods in the API 446 may be the only code that determines what file the configuration property 433 is stored in and the format of that file.

An API 446 with getter and/or setter methods enables the container module 430 to translate configuration commands 444 into invocations of methods included in the API 446 of the virtual machine module 442. The virtual machine module 442 may be written once, and reused by many different script developers who subsequently author the configuration commands 444.

Because of the close relationship between the application files 440 on a particular virtual machine image file 432 and the virtual machine module 442 written to access those files, the virtual machine module 442 may be included as a file in the particular virtual machine image file 432. The container module 430 may read and load the virtual machine module 442 directly from the virtual machine image file 432.

In some examples, the container module 430 may programmatically inspect the API 446 of a given virtual machine module 442 to determine what properties are supported by a given virtual machine module 442. For example, if the container module 430 and the virtual machine module 442 are written in Java, the container module 430 could use Java Reflection to find the names of the methods in the API 446 in order to determine what properties may be get or set.

Alternatively, each of the virtual machine image files 432 may include a declaration file. The declaration file may be configured to specify the configuration properties accessible by the virtual machine module 442 included in that virtual machine image file 432. The declaration file may be configured to also specify the methods of the API 446. In another example, the property declarations and/or the declarations of the methods of the API 446 may be stored in the virtual machine image file 432, but are stored in a portion of the virtual machine image file 432 that is not visible to the operating system 456 or application 450 when a virtual machine 452 is booted from the virtual machine image file.

In one example, the property declaration may follow the syntax of a programming language, such as the C programming language. For example, the syntax for declaring variables in the C language may be used to declare a configuration property; and the syntax for declaring methods in the C language may be used to declare methods of the API 446. Each method declaration may also include an offset from the beginning of the virtual machine module 442 that indicates the beginning of a binary implementation of a corresponding method of the API 446. The container module 430 may use the offset to calculate an address in memory containing the binary implementation of a predetermined method of the API 446.

By abstracting access logic to the access module 436, the virtual machine modules 442 may be neutral to the vendor virtualization software used, and may be portable across different vendor virtualization software. Furthermore, the configuration commands 444 may also be neutral to the vendor virtualization software used and thus portable across different vendor virtualization software.

The container module 430 may also be executable to make configuration properties obtained by one of the configuration commands 444 accessible to a subsequently executed configuration command. This permits, for example, setting a configuration property 433 stored in one virtual machine image file 432 to a value obtained from another configuration property obtained in a different virtual machine image file.

In another example, the API 446 of the virtual machine module 442 may include a method executable to delete a subset of the application files 440 included in at least one of the virtual machine image files 432. Through the deletion of the subset of application files, the method may be executable to uninstall one or more applications from the virtual machine image file 432.

In another example, the API 446 of the virtual machine module 442 may include a notify method. The notify method may have a method name (e.g., "notifySecondConfigurationProperty") in the form of a prefix (e.g., "notify") concatenated with the name of a configuration property 448 (e.g. "SecondConfigurationProperty"). The notify method may be passed a value argument from a module invoking the notify method. The notify method is executable to set the configuration property 448 of an application 450 configured in the virtual machine image file 432 to the value argument after a virtual machine 452 is booted from the virtual machine image file 432. The notify method may be useful because changes to the configuration property 433 in the virtual machine image file 432 after the virtual machine 452 is booted, may not be read by the application 450 executing within the booted virtual machine 452.

The notify method of the virtual machine module 442 may be in communication with an agent 454 that executes in the booted virtual machine 452. In one example, the agent 454 may be stored in the virtual machine image file 432. In some examples, the notify method may use a standard protocol such as TCP/IP, HTTP, SOAP, SMP, etc. to communicate with the agent 454. In other examples, the notify method may communicate with the agent 454 using a VMMS. The VMMS may provide the ability to programmatically launch processes in the virtual machine 452 booted using the VMMS. For example, the VMMS may have this functionality if the booted virtual machine 452 executes in a host operating system using a hosted hardware emulator and the VMMS executes in the host operating system. A hosted hardware emulator is software that runs within the host operating system and emulates hardware. A "guest" operating system 456 may run on the hosted hardware emulator, and thus executes a second operating system within the host operating system.

In one example, the container module 430 may determine whether to invoke the notify method or the setter method included in the API 446. If the container module 430 executes a configuration command 444 that sets a configuration property, 433 or 448, the container module 430 may invoke the notify method if the virtual machine 452 is booted, but invoke the setter method if the virtual machine 452 is not booted. In another example, the container module 430 may always invoke the setter method, but only invoke the notify method if the virtual machine 452 is booted. In yet another example, the configuration command 444 itself indicates whether to invoke the notify method or the setter method.

In one example, the agent 454 may invoke a method in the virtual machine module 442, to set the configuration property 448 of the application 450. In that example, the virtual machine module 442 may additionally be stored in application files 458. In other words, the virtual machine module 442 may run within the guest operating system 456, and therefore be considered an application—the virtual machine module 442, therefore, may appropriately be included in the application files. The agent 454 may be generic code used by multiple virtual machine modules 442.

The container module 430 may be executable to convert a text value passed from one of the configuration commands 444 as a value argument of a method included in the API of the virtual machine module 442 from a text data type to a predetermined data type of the value argument. This functionality may make it easier for a developer to create the virtual machine module 442 because the developer may use an appropriate data type in the method included in the API and not need to write code to convert the text value passed from the one of the configuration commands 444. The container module 430 may also retain a value in a variable using the predetermined data type as returned by a method in the virtual machine module 442. The container module 430 may then pass the unconverted value retained in the variable to a method in the virtual machine module 442 if such a request is made in one of the subsequently executed configuration commands 444.

Figure 5:
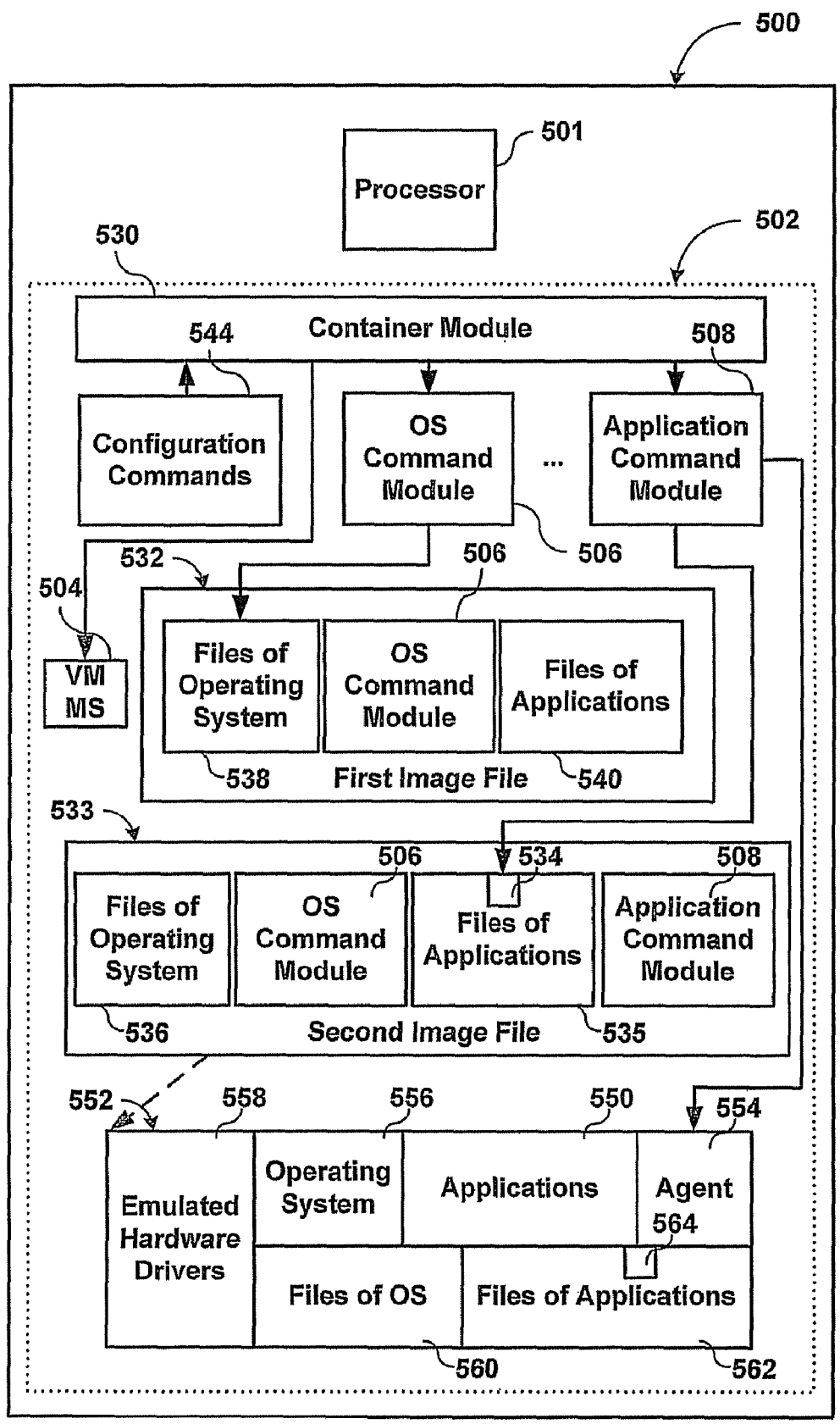
FIG. 5 is an illustration of a fourth example of a computing device for configuring virtual machines.

FIG. 5 is an illustration of a fourth example of a computing device 500 for configuring virtual machines. The computing device 500 may include a processor 501 and memory 502. The processor 501 is in communication with the memory 502. Image files, 532 and 533, may be stored in the memory. Each image file, including a first and second image file, 532 and 533, may be in a virtual machine image format and comprises files of an operating system 538 and files of one or more applications 540. The computing device 500 may also include a virtual machine management system 504 (VMMS) embodied in the memory 502.

The VMMS 504 may be executable with the processor 501 to boot a virtual machine 552 from an image file, 532 or 533, in a virtual machine image format. The virtual machine 552 may be configured to emulate hardware drivers 558 of a computer system to enable one or more applications 550 and a VM operating system 556 of the image file, 532 or 533, to execute in the virtual machine 552.

The computing device 500 may also comprise configuration commands 544 embodied in the memory 502. The configuration commands 544 may be executable with the processor 501. The configuration commands 544 may be read from a file or multiple files. In another example, the configuration commands 544 may be received over a network or some other location external to the computing device 500 using any known or later discovered protocol such as TCP/IP, HTTP, SOAP, etc.

The configuration commands 544 may include a first configuration command. The first configuration command may be executable to get a first property of the operating system 538 of the first image file 532. The first configuration command may obtain the first property using an operating system command module 506. The operating system command module 506 may be specific to a particular type of operating system, such as Windows, Linux, Macintosh, etc. The operating system command module 506 may be executable to, for example, locate a given property from one or more files of the operating system 538.

The configuration commands 544 may include a second configuration command that is executable to set a second property 534 included in one or more of the files of applications 535 of the second image file 533. The second configuration command may set this property using the application command module 508.

The computing device 500 may include any number of command modules, such as the operating system command module 506 and the application command module 508. Each of the command modules may be executable to implement at least one configuration command. The application command module 508 may be configured to implement all of the configuration commands configured to access properties of one of the applications 550, where the properties are stored in files of the one or more applications 535 included in the second image file 533. Indeed, if the same one application is included in multiple image files, 532 and 533, then the same application command module may be used to access properties of that application in any of the multiple image files, 532 or 533.

The computing device 500 may include a container module 530 embodied in the memory 502 and executable with a processor 501. The container module 530 may be configured to execute the command module, 506 or 508, corresponding to each of the configuration commands 544, where the command module actually implements the configuration command. In one example, each image file, 532 and 533, may contain a copy of any operating system command module 506 or application command module 508 executable to access a property stored in either the files of the operating system, 536 or 538, or the files of the applications, 535 or 540, included in the image file, 532 or 533. The container module 530 may be configured to read each command module, 506 or 508 from each image file, 532 and 533.

In another example, the computing device 500 may include a parser module stored in the memory 502 and executable with the processor 501 to obtain the configuration commands 544 from a representation, such as XML, of the configuration commands. The parser may be further executable to identify each of the configuration commands 544, to marshal the configuration commands into a determined order, and to identify syntax and semantic errors in the representation. An example semantic error would be accessing a property of a virtual machine that did not exist. In the event of an error, the parser module may indicate such an error and/or halt execution of the configuration commands. The parser module may be included in the container module 530.

Any form of XML representation may be employed. Some example forms of particular configuration commands are given below and should not be construed to limit the possible forms used.

The configuration commands 544 may include an instantiation command executable to map an identifier to a copy of a specified image file 532 or 533. The identifier may be any text (including a number or symbols) that uniquely identifies a virtual machine, which may or may not be booted. In one example, the instantiation command may be represented as the following XML command:

<VM id="dbserver" image="c:\ubuntu.vmx"/>

An "image" attribute of the XML element specifies the location of a base virtual machine image to use. An "id" attribute specifies the name of an identifier of the virtual machine that subsequently executed configuration commands may reference to access configuration properties of that virtual machine. In one example, the instantiation command may make a copy of a base virtual machine image file specified in the image attribute, and all subsequent configuration commands referencing that virtual machine identifier may access the copy. For efficiency reasons, only a portion of the image file may need to be copied. Alternatively, subsequent configuration commands referencing that virtual machine identifier may access the image file specified in the image attribute instead of a copy of that image file.

A first configuration command executable to get a first property of the operating system of the first image file 532 or 533 may be represented as the following XML command:

<property-path id="dbserverip" path="dbserver.ipaddr"/>

The value of a "path" attribute of <property-path/> XML element may specify the first property and may follow the form "virtual machine identifier.property name". An "id" attribute may specify a variable name that may be referenced by a subsequently executed configuration command, where the subsequently executed configuration command may obtain a value of the first property. The "id" attribute may be optional. During execution of the above XML command in one example, the container module 430 may replace the <property-path/> XML element with the value of the first property.

One configuration command may pass a value to another configuration command by being represented as a child XML element, where the other configuration command is represented as a parent XML element. For example, a second configuration command executable to set a second property 534 in a file of one of the files of applications 535 of the second image file 533 to the first property obtained by the first configuration command may be represented as the following XML commands:

```
<VM id= "webserver">
    <property name= "databaseIpAddress">
        <variable id="dbserverip"/>
    </property>
</VM>
```

A <VM> XML element with an "id" attribute may specify an identifier of a virtual machine to configure. In this example, some prior instantiation command may have mapped the "webserver" identifier to a particular image file.

A <property> XML element indicates that a command follows that operates on the property identified by a "name" attribute. In this example, the property name is "databaseIpAddress." Because the <property> XML element is a child element of the <VM> element, the identified property is a property of the virtual machine identified in the <VM> element. Therefore, the example XML above represents a command to set the "databaseIpAddress" property of a virtual machine with an identifier of "webserver." The <variable> element evaluates to the value of the variable indicated by the "id" attribute. Because the <variable> XML element is a child element of the <property> XML element, the XML represents commands to set the property to the value of the variable. In this example, the XML represents commands to set the "databaseIpAddress" property of a virtual machine with an identifier of "webserver" to the current value of the "dbserverip" variable.

Instead of using a variable, the first and second configuration commands discussed above may be represented as the following XML commands:

```
<VM id= "webserver">
    <property name= "databaseIpAddress">
        <property-path path="dbserver.ipaddr"/>
    </property>
</VM>
```

A <property-path> XML element gets the value of an "ipaddr" property of a virtual machine having the "dbserver" identifier. A <property> XML element sets the property "databaseIpAddress" of the virtual machine having a "webserver" identifier to the value obtained from getting the "ipaddr" property. Instead of using the <property-path> XML element, the property-path attribute may be used for the same effect, but with a more concise representation:

```
<VM id= "webserver">
    <property name= "databaseIpAddiess"
    property-path="dbserver.ipaddr"/>
</VM>
```

Configuration commands may also specify constant values. For example, the following commands set a "databaseIpAddress" property of a virtual machine identified by "webserver" to the value of "192.168.33.190."

```
<VM id= "webserver">
    <property name="databaseIpAddress">
        <value>192.168.33.190<value/>
    </property>
</VM>
```

Alternatively, a "value" attribute on a <property> XML element may be used instead of a child <"value"> XML element. In another example, the following configuration command is a set variable command that may set a variable in the memory 201 to a specified value for use by a subsequently executed configuration command through a reference to the variable:
<variable id="dbserverip" value="192.168.33.190"/>

An attribute "value" contains a specified value. A reference may be made to the value of an "id" attribute. For example, a subsequently executed configuration command may make reference to the example variable with the XML element <variable id="dbserverip"/> as indicated in one of the examples above.

The configuration commands may also include a concatenate command executable to concatenate two or more values. In other examples, more elaborate string manipulation may be supported. For example, the following concatenate command represented in XML concatenates the value of two variables, "firstValue" and "secondValue," into a string stored in a variable called "largerstring":

```
<concatenate id= "largerstring">
    <variable id="firstValue"/>
    <variable id="secondValue"/>
</concatenate>
```

The configuration commands may also include a boot virtual machine command executable to boot a specified virtual machine 552 from an image file, 532 or 533. For example, a boot virtual machine command may be represented as:

<VM id="webserver" action=poweron/>

An "id" attribute may specify an identifier of a virtual machine previously specified in an instantiation command. The "action" attribute may specify an action to perform on the specified virtual machine. In this example, "poweron" indicates that the virtual machine 552 should be booted from the image file, 532 or 533, previously specified in the instantiation command. Alternatively, an image file may be specified with an "image" attribute on the <VM> XML element to both instantiate and boot the virtual machine 552. The "action" attribute may specify other actions such as a shutdown of the virtual machine 552.

The container module 430 may direct the execution of the configuration commands 444 in an order dictated by the order in which the container module 430 obtained the configuration commands 444. Alternatively, the configuration commands 444 may include logic commands that alter the order of execution.

The container module 430 may serially execute the configuration commands 444. In a different example, the container module 430 may execute the configuration commands 444 in parallel. If no dependency relationship between two virtual machines is indicated in the configuration commands 444, then configuration commands 444 operating on one of the two virtual machines may execute in parallel with configuration commands 444 operating on the other of the two virtual machines. One example of indicating a dependency relationship between two virtual machines may be to explicitly do so a configuration command 444:

```
<VM id="webserver" image="c:\webserver.vmx" depends-on="dbserver" />
```

In some examples, the container module 501 may process <include> XML elements or XML processor instructions to include XML files. In these examples, configuration commands operating only on certain applications or virtual machines may be contained in a dedicated file. A single XML file may then include multiple dedicated files.

The example computing device 500 shown in FIG. 5 includes a booted virtual machine 552 embodied in the memory 502 and executed by the processor 501. The booted virtual machine 552 may be booted from one of the images files, 532 or 533. The booted virtual machine 552 may include a booted virtual machine (BVM) operating system 556 and one or more BVM applications 550. The booted virtual machine 552 may also include an agent module 554.

The booted virtual machine 552 may have access to files of a BVM operating system 560 and files of the one or more BVM applications 562. The files of the BVM operating system 560 may not be the same copy of the files of the operating system 536 or 538, and the files of the one or more BVM applications 562 may not be the same copy of the files of the one or more applications 535 or 540 stored in the image file, 532 or 533. For example, if the files of the BVM operating system 560 and the files of the one or more BVM applications 562 are different, then any configuration command 544 accessing the second property 534 will not necessarily access the value of a third property 564 included in the files of the one or more BVM applications 562 even if the name of the second and third property is the same, and the virtual machine 552 were booted from the second image file 533.

To circumvent this issue, the application command module 508 may communicate with the agent module 554 executing in the virtual machine 552. The agent module 554 may be configured to access the third property 564 of one of the applications 550 executed in the booted virtual machine 552. The agent module 554 may be configured to get or set the third property 564.

If the configuration commands 544 include a dynamic configuration command, that command may execute the application command module 508, where the application command module 508 may communicate with the agent module 554 to access the third property 564. In some examples, the dynamic configuration command may additionally modify the second property 534 in the second image file 533.

Figure 6:
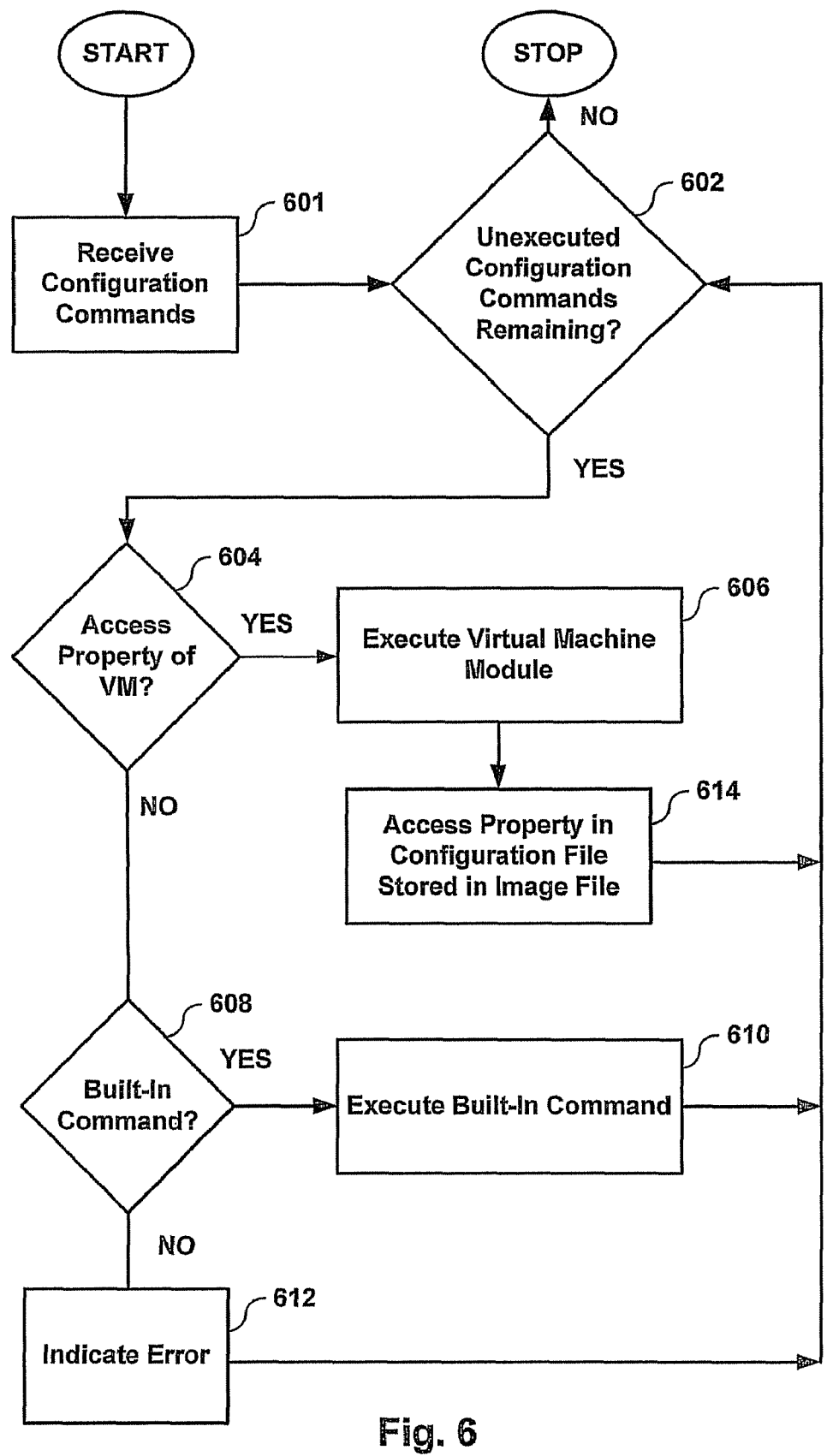
FIG. 6 is a flow diagram illustrating an example operation of configuring virtual machines using configuration commands.

FIG. 6 is a flow diagram illustrating an example operation to configure a virtual machine using configuration commands. As previously discussed, the virtual machine may comprise hardware emulation software, an operating system configured to execute on the hardware emulation software, and at least one application configured to execute within the operating system. In addition, the virtual machine has properties corresponding to configuration settings of the operating system and the at least one application.

For example, a configuration setting of the operating system may be a network address configuration setting. In that example, a property of a virtual machine with that operating system would be a network address, which corresponds to the network address configuration setting. Similar to the operating system, an application, such as a web server, may have a configuration setting, such as a listening address. In that example, a property of a virtual machine with the web server application would be a web server listening address, which corresponds to a listening address configuration setting of the web server application.

The operation begins, at block 601, by receiving configuration commands such as XML configuration commands. Configuration commands may be received from a network. Commands may be received using a protocol, such as TCP/IP, HTTP, SOAP, proprietary, etc. Alternatively, receiving configuration commands may include reading configuration commands from a file. The configuration commands may be configured to access static properties of a virtual machine. In some examples, the configuration commands may also be configured to access dynamic properties of the virtual machine.

The operation in some examples may include storing all of the configuration commands that operate on a particular virtual machine in a file included in an image file of that virtual machine. Then, when receiving configuration commands at block 601, the configuration commands that operate on the particular virtual machine are read from the image file.

In this example, executing the configuration commands may occur at least at blocks 602, 604, 606, and 608. The operation may include checking for any unexecuted configuration commands remaining at block 602. If there are no unexecuted configuration commands remaining, then the operation completes.

However, if there are any remaining unexecuted configuration commands detected at block 602, then the operation may include checking whether the next command to execute accesses a property of a virtual machine (VM) at block 604. If the next command does access a property of a virtual machine, the operation may proceed to executing a virtual machine module at block 606.

However, if the next command does not access a property of a virtual machine, the operation may proceed to checking for a built-in command module to execute the next command at block 608. A built-in command module may be implemented independently of the contents of a virtual machine. For example, booting a virtual machine may be implemented as a built-in command module.

If a built-in command module exists for the next command, the operation may proceed to executing the built-in command module at block 610 and returning to block 602. If no built-in command exists for the next command, an error may be indicated at block 612 and operation returns to block 602 to check for any remaining unexecuted commands. The check at block 604 and the check at block 612 may be executed in the reverse order.

As mentioned above, the operation may proceed to executing a virtual machine module at block 606. At block 606, the operation may include validating that the virtual machine module supports accessing a property specified in the next command. The operation may include executing a method on the virtual machine module that supports accessing the property specified in the next command. The operation may also include making a property value returned by the method available to subsequently executed commands.

Executing the method on the virtual machine module may include accessing a property in a configuration file stored in an image file at block 614. For example, where the next command is a command to read a first property of a first virtual machine and the first property is a static property, the operation may include reading the first property from an operating system configuration file that is stored in a first image file of the first virtual machine. The first property may be a property of the first virtual machine because an operating system has a first corresponding configuration setting stored in the operating system configuration file.

In another example, where the next command is a command executable to write a second property of a second virtual machine and the second property is static, the operation may include writing the second property to an application configuration file stored in a second image file of the second virtual machine. The second property may be a property of the second virtual machine because an application of the second virtual machine has a corresponding configuration setting stored in the application configuration file.

In other examples, executing a method on a virtual machine module at block 606 may not include directly accessing the property of the virtual machine in a configuration file indicated at block 614. For example, accessing a property of a virtual machine that corresponds to an operating system setting may include obtaining the property using a virtual machine management system (VMMS). The VMMS may be able to read certain operating system properties from the image file, such as a Media Access Control address (MAC address) or Ethernet Hardware Address (EHA) or hardware address or adapter address.

In still other examples, executing a method on a virtual machine module at block 606 may include accessing network services. For example, if the first property mentioned above is a network address of the first virtual machine, the network address may be dynamically obtained when the first virtual machine boots. However, accessing the network address property before booting the first virtual machine may be desirable. For example, accessing the network address prior to booting may be desirable if other properties of the first virtual machine are set using the network address before booting the first virtual machine.

In that example, accessing the network address property may include accessing a network service. Executing a method on a virtual machine module at block 606 may include first obtaining a unique identifier of the first virtual machine from the first image file of the first virtual machine. The unique identifier may be a MAC address, a host name, or any other unique identifier that may be obtained from the first image file. The operation would then include communicating with a network service such as a Dynamic Host Configuration Protocol (DHCP) server to dynamically obtain the network address based on the unique identifier.

Through the use of the virtual machine configuration system, virtual machines may be quickly configured with little or no manual configuration. Once the configuration commands are authored, the virtual machine may be configured in many different environments with little or no modification to the configuration commands and little or no further manual configuration.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A computing device for configuring virtual machines, the computing device comprising a computer readable memory and a processor, wherein the computer readable memory comprises computer code and a plurality of virtual image files, the virtual image files including a first virtual image file and a second virtual image file, the computer code comprising:
 a plurality of virtual machine modules; and
 a container module executable with the processor to direct execution of the plurality of virtual machine modules to modify a first configuration property of a first software program based on a value of a second configuration property of a second software program, wherein the first software program is stored on the first virtual image file and the second software program is stored on the second virtual image file; and
 wherein the plurality of virtual machine modules includes a first virtual machine module and a second virtual machine module, the first virtual machine module is executable with the processor to modify the first virtual image file to write the first configuration property of the first software program, and the second virtual machine module is executable with the processor to read the second configuration property of the second software program from the second virtual image file, wherein,
 each one of the plurality of virtual image files is bootable as a different respective one of a plurality of virtual machines configured to emulate hardware,
 further wherein the container module is executable with the processor to direct execution of a plurality of configuration commands stored in the computer readable memory, wherein at least one of the configuration commands is configured to direct execution of the first virtual machine module to modify the first virtual image file.

2. The computing device of claim 1, wherein the first software program is an application and the second software program is an operating system.

3. The computing device of claim 1, wherein each of the virtual machine modules is included in a different respective one of the virtual image files.

4. The computing device of claim 1, wherein each of the virtual image files includes a declaration file, the declaration file configured to specify a set of configuration properties accessible by the virtual machine modules included in each respective one of the virtual image files.

5. The computing device of claim 1, wherein the configuration commands comprise a remove command, and the first one of the virtual machine modules is executable to delete an application from the first virtual image file in response to receipt of a predetermined value by the first one of the virtual machine modules from the remove command.

6. The computing device of claim 1, wherein the second one of the virtual machine modules includes a getter submodule, and the second one of the virtual machine modules is executable to read the second configuration property of the second virtual machine from the second virtual image file with the getter submodule.

7. The computing device of claim 1, wherein the first one of the virtual machine modules includes a setter sub-module, and the first one of the virtual machine modules is executable to set the first configuration property in the first virtual image file with the setter sub-module.

8. The computing device of claim 7, wherein the first one of the virtual machine modules comprises a notify sub-module, and the first one of the virtual machine modules is executable, with the notify sub-module, to set the first configuration property of the first software program when the first software program is executed in a booted virtual machine.

9. The computing device of claim 1, wherein the container module is executable with the processor to direct a first subset of the configuration commands to execute in parallel with a second subset of the configuration commands.

10. A computing device for configuring virtual machines, the computing device comprising:
 a memory;
 a processor in communication with the memory;
 a plurality of virtual image files stored in the memory, including a first virtual image file and a second virtual image file, wherein:
 each one of the first virtual image file and the second virtual image file comprises a plurality of software programs, the software programs including an operating system and at least one application; and
 the processor is executable to boot a respective virtual machine from the first virtual image file and the second virtual image file, respectively, the respective virtual machine configured to emulate hardware;
 a plurality of configuration commands stored in the memory, the configuration commands comprising a first configuration command and a second configuration command, each of the configuration commands executable with the processor, wherein the first configuration command is executable to read a first configuration property of a first software program from the first virtual image file and the second configuration command is executable to write to the second virtual image file in order to set a second property of a second software program in the second virtual image file, the second configuration property set to a value of the first configuration property read with the first configuration command; and a plurality of command modules stored in the memory, the command modules comprising an application command module, each one of the command modules executable with the processor to implement respective one of the configuration commands, wherein the application command module is configured to implement any one of the configuration commands that access configuration properties of the second software program, wherein the first software program is the operating system included in the first virtual image file, the second software program is one of the at least one application included in the second virtual image file.

11. The computing device of claim 10, further comprising:
a container module stored in the memory and executable with the processor to read the configuration commands, to load the command modules into the memory, and to direct the command modules to execute the configuration commands.

12. The computing device of claim 10, further comprising a parser module stored in memory and executable with the processor to parse a representation of the configuration commands to identify each of the configuration commands, to marshal the configuration commands into a determined order, and to identify any syntactic and semantic errors in the representation.

13. The computing device of claim 10, wherein the configuration commands further comprise an instantiation command executable to map an identifier to a copy of the first virtual image file; and anyone of the configuration commands configured to reference the identifier is executable to access the copy of the first virtual image file instead of the first virtual image file.

14. The computing device of claim 10, wherein the configuration commands further comprise a boot virtual machine command executable to boot the respective virtual machine from a respective one of the first and second virtual image files.

15. The computing device of claim 11, wherein the configuration commands further comprise a set variable command executable to set a variable in the memory to a predetermined value, and the container module is executable to read the predetermined value by request of anyone of the configuration commands executed after the set variable command is executed.

16. The computing device of claim 10, further comprising a booted virtual machine embodied in the memory and executable by the processor, wherein the booted virtual machine is booted from the second virtual image file; an agent module is stored in the memory and is executed with the processor in the booted virtual machine, the agent module is configured to set a third configuration property of the second software program executed in the booted virtual machine; and the configuration commands further comprise a dynamic configuration command, the dynamic configuration command executable with the processor to communicate with the agent module and to set the third configuration property through communication with the agent module.

17. A method for configuring a plurality of virtual machines comprising a first virtual machine and a second virtual machine, wherein the first virtual machine comprises a first hardware emulation software, a first operating system configured to execute on the first hardware emulation software, and a first application, the first application configured to execute within the first operating system, and wherein the second virtual machine comprises a second hardware emulation software, a second operating system configured to execute on the second hardware emulation software, and a second application configured to execute within the second operating system, the method comprising:

receiving a plurality of configuration commands, the configuration commands comprising a first command executable to read a first configuration property of the first virtual machine from a first virtual image file and a second command executable to write a second configuration property of the second virtual machine to a second virtual image file, wherein the first virtual machine is bootable from the first virtual image file and the second virtual machine is bootable from the second virtual image file;

reading the first configuration property of the first virtual machine from the first virtual image file by executing the first command; and setting the second configuration property of the second virtual machine to a value of the first configuration property of the first virtual machine by executing the second command, wherein executing the second command includes writing the value of the first configuration property to the second virtual image file, the second configuration property including a configuration property of the second application.

18. The method of claim 17, wherein the executing the first command includes reading the first configuration property of the first virtual machine from an operating system configuration file stored in the first virtual image file.

19. The method of claim 17, wherein executing the first command includes a virtual machine management system reading the first configuration property from the first virtual image file without the first virtual machine booting.

20. The method of claim 17, wherein the first configuration property is a network address of the first virtual machine.

21. The method of 18, the method further comprising:
storing all of the configuration commands that operate on the first virtual machine in the first virtual image file and all of the configuration commands that operate on the second virtual machine in the second virtual image file.

22. The method of claim 17, further comprising encapsulating, in a virtual machine module for the first application, logic to determine a location on the first virtual image file of an application file of the first application, wherein the first configuration property is stored in the application file and the virtual machine module is executable by a processor.

* * * * *